(12) United States Patent
Krinke

(10) Patent No.: US 7,256,968 B1
(45) Date of Patent: Aug. 14, 2007

(54) MICROACTUATED DIMPLE FOR HEAD SUSPENSIONS

(75) Inventor: Todd A. Krinke, Rockford, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 255 days.

(21) Appl. No.: 09/952,121

(22) Filed: Sep. 11, 2001

Related U.S. Application Data

(60) Provisional application No. 60/231,894, filed on Sep. 11, 2000.

(51) Int. Cl.
 *G11B 21/10* (2006.01)
(52) U.S. Cl. .................................... 360/294.3
(58) Field of Classification Search ............. 360/294.3, 360/294.4, 245.1, 245
See application file for complete search history.

(56) References Cited

U.S. PATENT DOCUMENTS

| | | | |
|---|---|---|---|
| 5,745,319 | A | 4/1998 | Takekado et al. |
| 5,856,896 | A | 1/1999 | Berg et al. |
| 5,898,541 | A | 4/1999 | Boutaghou et al. |
| 5,959,808 | A | 9/1999 | Fan et al. |
| 6,046,884 | A | 4/2000 | Crane |
| 6,072,664 | A * | 6/2000 | Aoyagi et al. ............ 360/244.5 |
| 6,078,473 | A * | 6/2000 | Crane et al. ............. 360/294.3 |
| 6,246,552 | B1 | 6/2001 | Soeno et al. |
| 6,381,104 | B1 * | 4/2002 | Soeno et al. ............. 360/294.4 |

FOREIGN PATENT DOCUMENTS

| | | |
|---|---|---|
| DE | 19816909 | 11/1998 |
| EP | 0 840 291 A2 | 5/1998 |
| JP | 63291271 | 11/1988 |
| JP | 1276478 | 11/1989 |
| JP | 10011923 | 1/1998 |
| JP | 10027446 | 1/1998 |

(Continued)

OTHER PUBLICATIONS

Article: "Piezoelectric Piggy-Back Microactuator for Hard Disk Drive", Soeno, S. Ichikawa, T.Tsuna, Y.Sato, and I.Sato, IEEE Transactions on Magnetics, vol. 35, No. 2, Mar. 1999.

(Continued)

*Primary Examiner*—Hoa T. Nguyen
*Assistant Examiner*—Mark Blouin
(74) *Attorney, Agent, or Firm*—Faegre & Benson LLP

(57) ABSTRACT

A head suspension for supporting a head slider over a disk in a dynamic storage device and providing precise movement of the head slider relative to tracks on the disk. The head suspension includes a load beam, a flexure having a slider mounting region, and a dimple interface transmitting a load beam force to the slider mounting region. The head suspension further includes a microactuator mounted to the load beam. Movement of the microactuator is transmitted through the dimple interface by action of frictional forces at the dimple interface so as to cause movement of the slider mounting region transverse to tracks on the disk. A method of precisely moving a head slider supported by a head suspension includes providing and driving a microactuator configured to transmit movement of the microactuator to a slider mounting region through a dimple interface by action of frictional forces at the dimple interface.

21 Claims, 12 Drawing Sheets

FOREIGN PATENT DOCUMENTS

| | | |
|---|---|---|
| JP | 11053854 | 2/1999 |
| JP | 11185417 | 7/1999 |
| JP | 11213365 | 8/1999 |
| JP | 11213419 | 8/1999 |
| JP | 11259841 | 9/1999 |
| JP | 11273041 | 10/1999 |
| WO | WO98/19304 | 5/1998 |
| WO | WO98/20487 | 5/1998 |
| WO | WO98/25264 | 6/1998 |
| WO | WO99/06993 | 2/1999 |

OTHER PUBLICATIONS

Article: "High Bandwidth High-Accuracy Rotary Microactuators for Magnetic Hard Disk Drive Tracking Servos", T. Hirano, L.S. Fan, et al., IEEE/ASME Transactions on Mechatronics, vol. 3, No. 3, Sep. 1998.

Article: "Electrostatic Microactuator and Design Considerations for HDD Applications", L.S. Fan, T. Hirano, J.Hong, P.R. Webb, et al., IEEE Transactions on Magnetics, vol. 35, No. 2, Mar. 1999.

Article: "Precision Positioning Using a Microfabricated Electrostatic Actuator", D. Horsely, R. Horowitz, N. Wongkomet, and A. Pisano, IEEE Transactions on Magnetics, vol. 35, No. 2, Mar. 1999.

Article: "MEMS-Based Integrated Head/Actuator/Slider for Hard Disk Drives", T. Imamura, M. Katayama, Y. Ikegawa, T. Ohwe, R. Koishi, and T. Koshikawa, IEEE/ASME Transactions on Mechantronics, vol. 3, No. 3, Sep. 1998.

Article: "Dual-Stage Actuator System for Magnetic Disk Drives Using a Shear Mode Piezoelectric Microactuator", S. Koganezawa, Y. Uematsu, and T. Yamada, IEEE Transactions on Magnetics, vol. 35, No. 2, Mar. 1999.

Article: "A Microactuator for Head Positioning System of Hard Disk Drives", H. Fujita, K. Suzuki, et al., IEEE Transactions on Magnetics, vol. 35, No. 2, Mar. 1999.

Article: "Micro-actuators for High Density Disk Drives", S.K. Aggarwal, D. A. Horsley, et al., Proceedings of the American Control Conference, Jun. 1997, 0-7803-3832-4/97.

Article: "Magnetic Recording Head Positioning at Very High Track Densities Using a Microactuator-Based, Two-Stage Servo System", L.S. Fan, Hal H. Ottesen, T. C. Reiley, and R. W. Wood, IEEE Transactions on Industrial Electronics, vol. 42, No. 3, Jun. 1995.

\* cited by examiner

MICROACTUATED DIMPLE FOR HEAD SUSPENSIONS

This application claims priority to a U.S. provisional patent application Ser. No. 60/231,894, entitled MICROACTUATED DIMPLE FOR PIEZOELECTRIC AND ELECTROSTATIC MICROACTUATORS, filed on Sep. 11, 2000 now abandoned, which is wholly incorporated by reference herein.

FIELD OF THE INVENTION

This invention relates to head suspensions with microactuation provided to a head slider through a load beam/flexure interface or dimple.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives include a load beam and a flexure. The load beam typically includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam, or gram load, to the flexure, provides clearance between the flexure and the load beam, and functions as a point about which the head slider can gimbal in pitch and roll directions to follow fluctuations in the disk surface.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of a another or secondary actuator or actuators, such as a piezoelectric, electrostatic or electromagnetic microactuator or fine tracking motor, mounted on the head suspension itself. These types of actuators are also known as second-stage microactuation devices and may be located at the base plate, the load beam or on the flexure.

Some of these attempts to improve tracking and head slider positioning control have included locating the microactuator at the head slider itself. Typically, this type of microactuator is sandwiched between the head slider and the head slider mounting surface of the flexure or other suspension component, or is otherwise directly coupled to the head slider. Movement of the microactuator then generally results in relatively direct movement of the head slider to provide the desired fine motion of the read/write head over the tracks of the disk drive.

One problem with this type of set up results from the need for the microactuator to produce enough force to overcome its own internal stiffness so that the desired amount of displacement is generated at the read/write head of the slider. The amount of force needed to generate a given displacement depends entirely on the microactuator type and configuration. In general, a piezoelectric actuator requires more force than an electrostatic actuator to produce the same amount of displacement, thus being characterized by high force and low displacement. An electrostatic comb or parallel plate driven actuator, on the other hand, is characterized by low force and high displacement. As a result, the flexure must provide enough rigidity to counteract the reaction forces of the microactuator. If the flexure is too compliant in both the in-plane and out-of-plane displacement directions, much of the slider displacement may be lost due to displacement/twisting of the flexure upon actuation. Also, since the reaction forces are transmitted from the microactuator to the flexure and then to the load beam, the reaction forces may excite undesired off-track displacement modes in the flexure.

Another problem that is encountered with such microactuator configurations, is the difficulty in transmittal of electrical signals to the slider. With the piezoelectric microactuators, the slider may be terminated with external, compliant flying or unsupported leads of the wireless flexure. However, terminating the slider in this manner could produce several problems or risks, including static attitude variation, assembly difficulty, stroke variation, and flyability, that is the ability of the head slider to fly above the disk, among others. With many of the other configurations, the microactuator may need to contain integral wiring to transmit the electrical signals from the flexure to the head slider. The requirement for integral wiring is especially important for electrostatic microactuators that generate small forces. For this situation, external flying or unsupported leads may not be used because the added stiffness of the leads may render the system motionless. The formation of integral wiring in an electrostatic microactuator would require very small electrical traces to be deposited and patterned on or off of thin silicon springs. One challenge for this situation is developing a multi-level metallization/plating process for fabricating the traces that connect the top bond pads of the microactuator to the bottom bond pads. Head suspension configurations that did not require direct electrical termination of the microactuator to the slider would be advantageous.

Another problem encountered with second-stage microactuation systems is shock robustness, especially in the piezoelectric configurations. In these configurations, the amount of shock able to be withstood is limited by the fracture limit of the piezoelectric material because much of the shock load passes through the piezoelectric element. Making the piezoelectric element thicker, wider or shorter will increase the shock robustness by increasing the stiffness of the element, but these changes will also result in a decrease in the amount of stroke provided by the element. Increases in shock robustness without losing stroke capability would be advantageous.

SUMMARY OF THE INVENTION

A head suspension is provided for supporting a head slider over a disk in a dynamic storage device and providing precise movement of the head slider relative to tracks on the disk. The head suspension includes a load beam, a flexure having a slider bonding region, and a dimple interface transmitting a load beam force to the slider bonding region. The head suspension further includes a microactuator mounted to the load beam. Movement of the microactuator is transmitted through the dimple interface by action of frictional forces at the dimple interface so as to cause movement of the head slider transverse to tracks on the disk. The microactuator is preferably a piezoelectric actuator or an electrostatic actuator. In one embodiment, the load beam includes a microactuator support to which the microactuator is mounted, with the microactuator support configured as a laterally compliant spring that provides vertical stiffness. In another embodiment, the microactuator support includes an aperture that provides access for contact between the microactuator and the slider mounting region. The dimple interface includes a dimple formed in the load beam, the slider mounting region or the microactuator.

A method of precisely moving a head slider supported by a head suspension over a disk in a dynamic storage device is also provided including the steps of providing a microactuator mounted to the load beam and configured to transmit movement of the microactuator to the slider mounting region through the dimple interface by action of frictional forces at the dimple interface, and driving the microactuator to move the slider mounting region and cause precise movement of the head slider transverse to tracks on the disk. Optionally, the method further includes the step of increasing the frictional forces at the dimple interface.

DETAILED DESCRIPTION OF THE INVENTION

Figure 1:
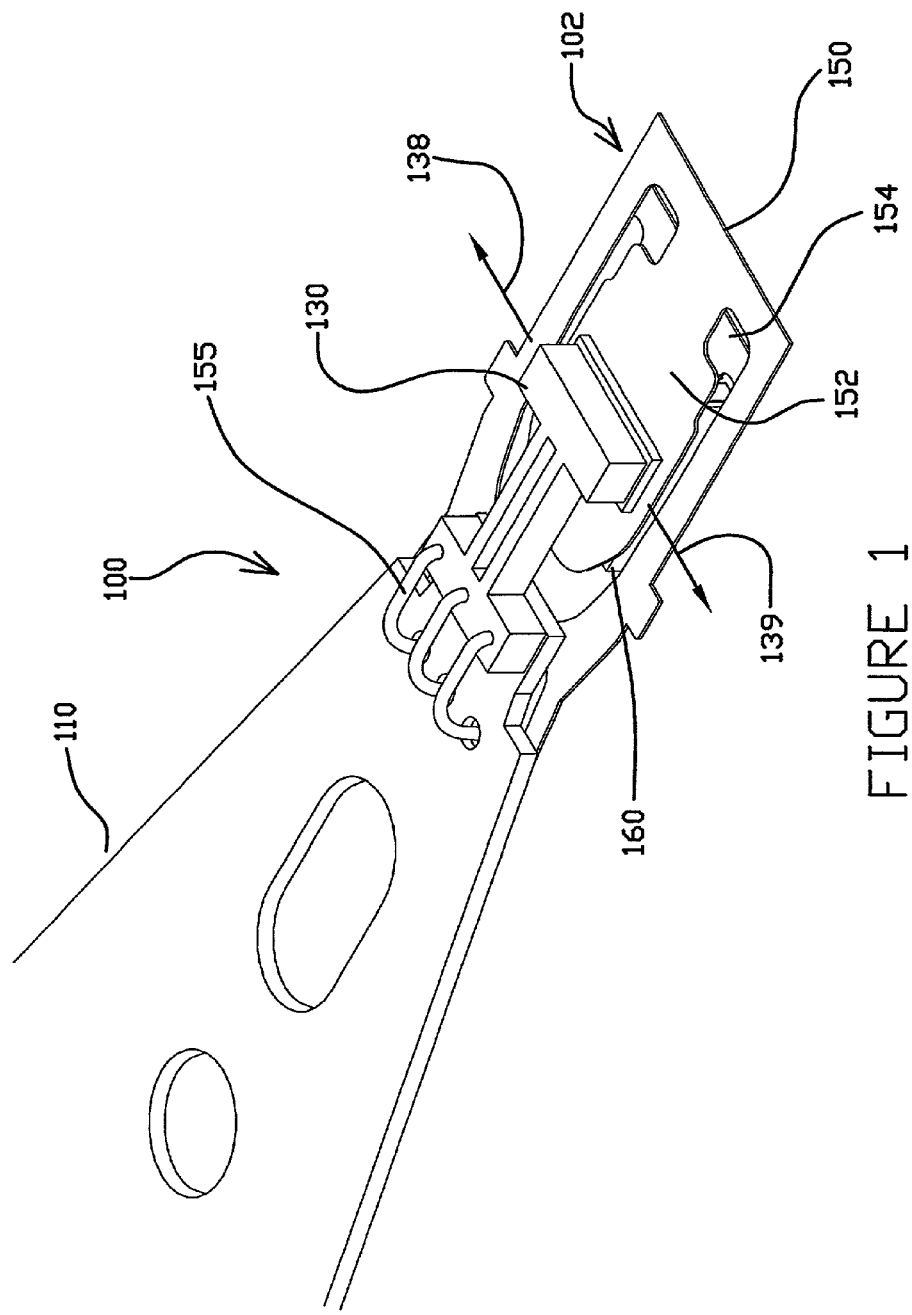
FIG. 1 is a perspective view of a portion of a first embodiment of a head suspension including a microactuator mounted to the load beam above the head slider.
Figure 2:
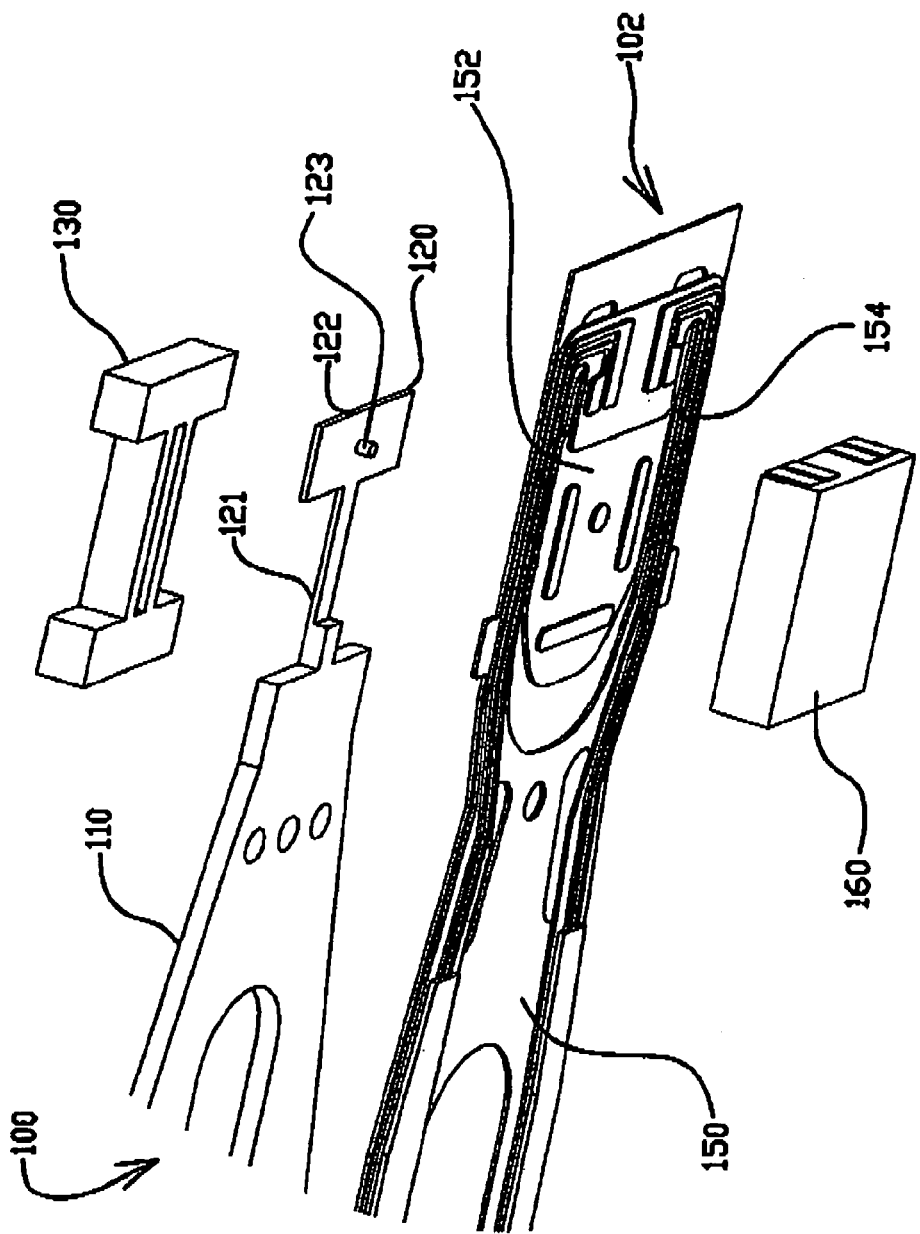
FIG. 2 is a perspective exploded view of the head suspension portion of FIG. 1.
Figure 3:
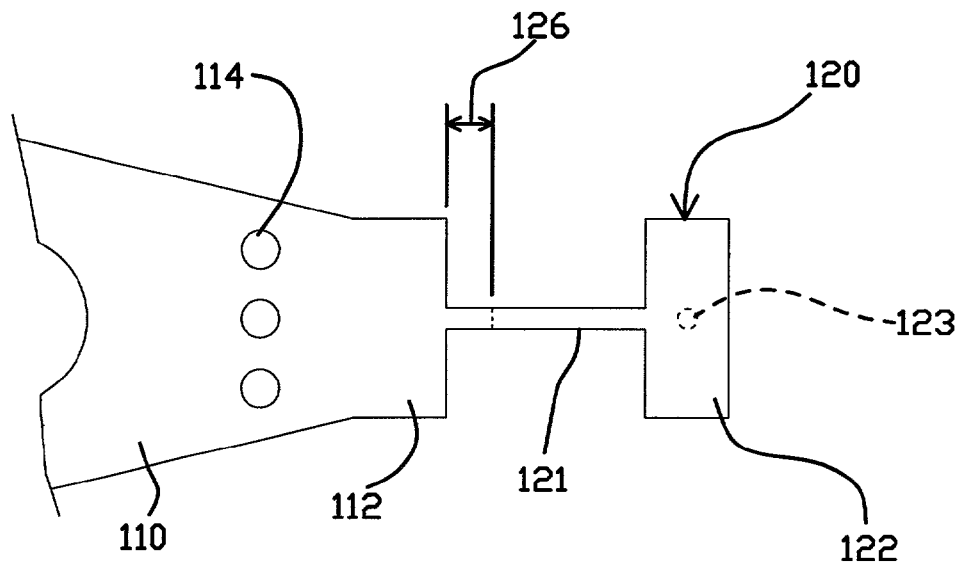
FIG. 3 is a top view of the load beam portion of FIGS. 1 and 2.
Figure 4:
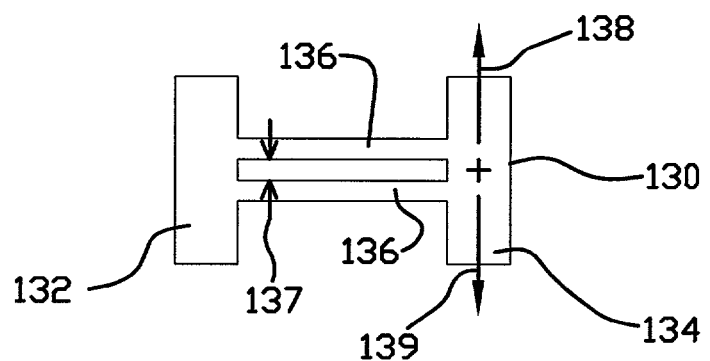
FIG. 4 is a top view of the microactuator of FIGS. 1 and 2.
Figure 5:
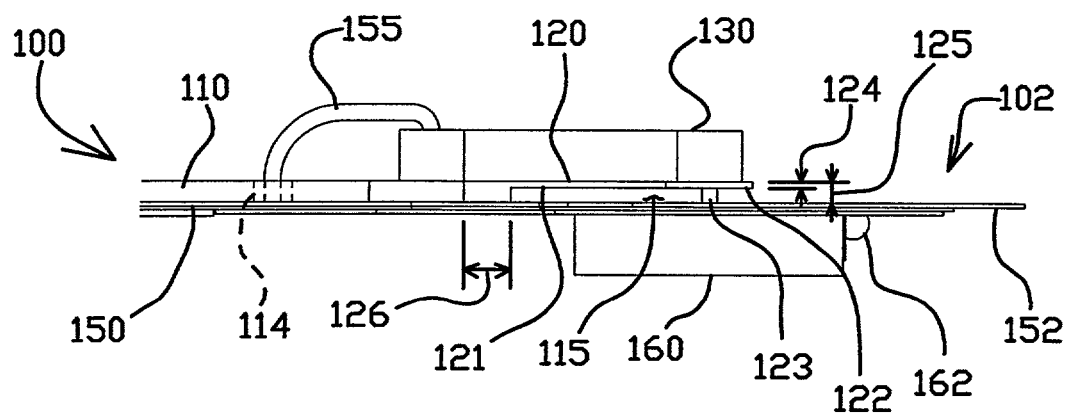
FIG. 5 is a side view of the head suspension portion of FIG. 1.

With reference to the attached Figures, it is to be understood that like components are labeled with like numerals throughout the several Figures. FIGS. 1-5 show one embodiment of a head suspension 100 including a load beam 110 and a flexure 150. The flexure 150 includes a slider mounting region or tongue 152 to which a head slider or read/write head 160 is mounted (e.g., by adhesive) at a distal end 102 of the head suspension 100. The head slider 160 is also electrically connected to electrical traces 154 on the flexure 150, such as by a solder balls 162 (of which only one is shown in FIG. 5) or other suitable method.

In this embodiment, the load beam 110 also includes a generally 'T' shaped projection 120 extending from a tip or distal end member 112. The projection 120 has relatively thin, elongated extension 121 and a cross member 122. Formed into the cross member 122 is a load beam/flexure interface or dimple 123. Dimple 123 is preferably formed by etching, but other suitable formation methods are also contemplated. The dimple 123 is sized to contact the tongue 152 and is positioned at about the center of rotation of the head slider 160. A recess 115 in the load beam 110, as shown best in FIG. 5, provides clearance for the flexure 150 to gimbal about the dimple 123. Alternatively, the dimple 123 may be formed in the tongue 152 at a comparable location, protruding toward the load beam 110. The load beam 110 and flexure 150 are preferably formed from stainless steel, but may be formed from any other suitable materials.

In this embodiment, the load beam 110 is relatively thick, having a thickness 125, to provide sufficient stiffness to the head suspension 100. The cross member 122 and a majority of the extension 121 have a thickness 124 that is thinner than the general load beam thickness 125. The extension 121 retains the thickness 125 of the load beam 110 for a length 126 to provide extra support/stiffness to the projection 120. In addition, the extra thickness provides for the formation of the dimple 123 by etching or other suitable material removal technique. However, it is to be understood that other dimple formation configurations and processes are also possible and contemplated.

The head suspension 100 also includes a microactuation device or microactuator 130 that has a generally 'I' shaped configuration. The microactuator 130 is preferably a piezoelectric device, but may include other suitable actuation devices, including but not limited to electrostatic or electromagnetic actuators. The microactuator 130 has a proximal cross piece 132 that functions as a fixed portion and a distal cross piece 134 that functions as a movable portion. The proximal and distal cross pieces 132, 134 are connected by a pair of center beams 136 that are spaced apart a distance 137. The microactuator 130 is mounted to the load beam 110 on the opposite side from the head slider 160. As a result, the microactuator 130 does not cause stack height problems by increasing the distance of the head slider 160 from the flexure 150. The microactuator 130 is positioned at the projection 120 with the distal cross piece 134 of the microactuator 130 overlying and preferably bonded to the cross member 122 of the extension 120. The proximal cross piece 132 of the microactuator 130 then overlies and is preferably bonded to the load beam end member 112, with the center beams 136 generally overlying the extension 121. The center beams 136 may be bonded to the extension 121, but do not need to be. Mounting of the microactuator 130 to the load beam 110 may be achieved by conventional methods, including but not limited to adhesive or other suitable bonding techniques. The microactuator 130 may be electrically connected to the traces 154 of the flexure 150 by wire stitching using wires 138 passed through the load beam 110 at openings or windows 114, or by other suitable methods. Corresponding openings or windows in the flexure 150 (not shown) may also be provided as needed to allow for connection of the microactuator 130 to the traces 154. These wires 138 do not adversely affect the actuation of the microactuator 130.

In this embodiment, the projection 120 functions as a laterally compliant but vertically supportive spring member that is at least partially bonded to the microactuator 130. As the microactuator 130 extends and contracts along the center beams 136, the distal cross piece 134 moves a desired amount or stroke in directions 138 and 139 that are generally transverse to the tracks on the disk. As the distal cross piece 134 moves, the load beam cross member 122 moves as well, resulting in corresponding movement of the dimple 123. The movement of the dimple 123 causes a corresponding movement of the tongue 152, and thus the head slider 160, a desired amount transverse to the tracks of the disk. This secondary movement or second stage actuation of the head slider allows the head slider to be precisely positioned over the desired location on the disk.

When the head suspension 100 is loaded with a spring region gram load, the dimple 123 transfers the load to the flexure 150 at the tongue 152, as described above in the Background section. This transferred gram load results in static friction or stiction between the dimple 123 and the tongue 152. The stiction force is designed to be greater than a static actuation force of the microactuator 130 plus the combined dynamic acceleration force imparted on the head slider 160 from the microactuator 130 and suspension arm actuation during operation of the disk drive and movement of the head suspension 100, such as during a seek operation. One typical type of suspension arm actuator is known as a voice coil motor, or VCM. If these static and dynamic forces exceed the stiction force during movement of the head suspension 100, then a slip-stick condition may occur in which the dimple 123 moves relative to the tongue 152 resulting in inaccuracies in positioning of the head slider 160. In the present invention, the head suspensions, such as 100, are designed to provide adequate stiction forces to ensure accurate head slider 160 positioning by the microactuator 130. An example demonstrating the sufficiency of the stiction force provided by the present invention is set forth below.

In this embodiment, the load beam 110 and projection 120 provide support to the microactuator 130 so that a large portion of the gram load and any shock load passes through the projection 120 and not the microactuator 130. Thus, shock robustness is improved.

Figure 6:
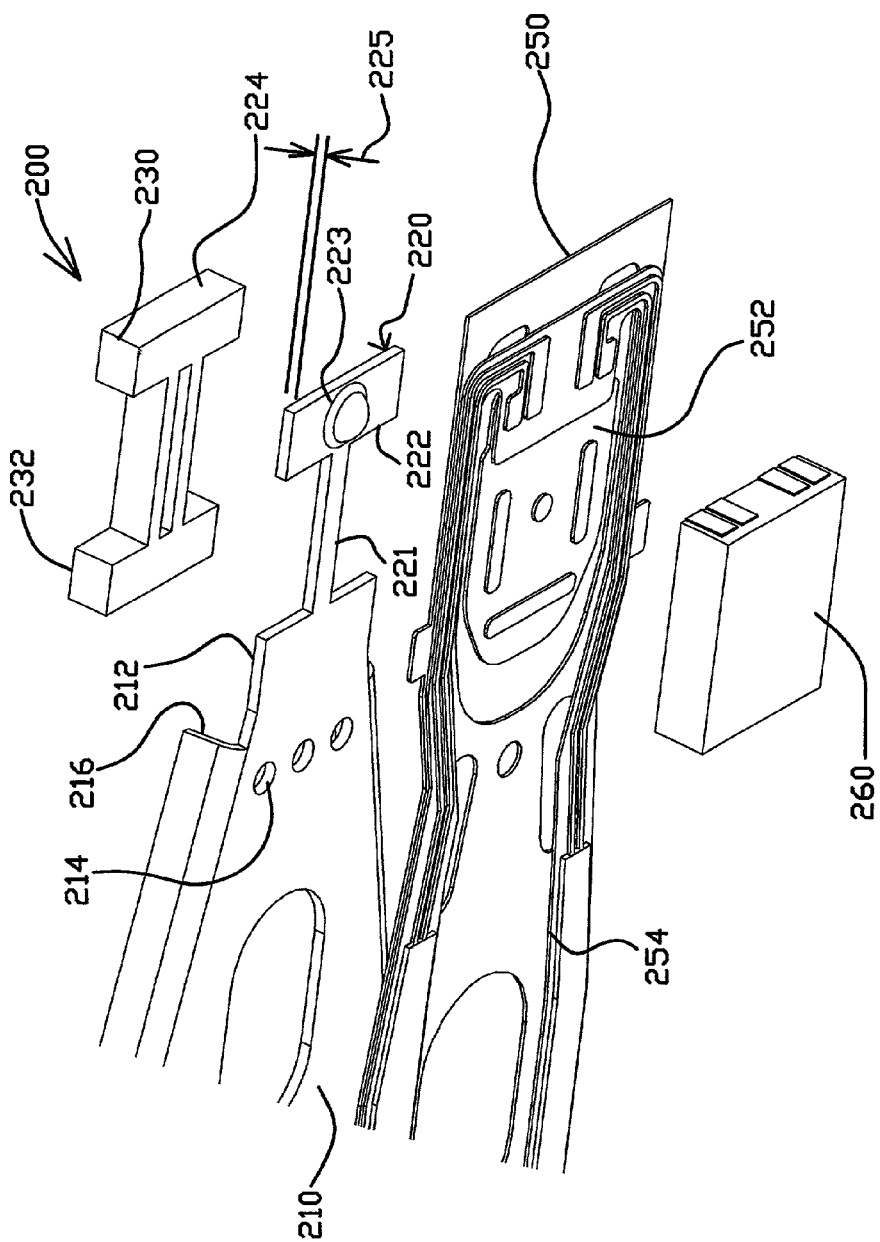
FIG. 6 is a perspective exploded view of a portion of a second embodiment of a head suspension including a microactuator mounted to the load beam above the head slider.

Referring now to FIG. 6, a second embodiment of a head suspension 200 is shown in accordance with the present invention. Head suspension 200 is similar to head suspension 100 and includes a load beam 210, a flexure 250 and a head slider 260 mounted to the flexure 250 at a slider mounting region or tongue 252, with the head slider 260 electrically terminated to traces 254 on the flexure 250 in a conventional and suitable manner. However, in this embodiment, load beam 210 has an overall uniform thickness 225 and includes side rails 216 that function as stiffening members to increase the stiffness of the generally thinner load beam 210 (as compared to the thicker load beam 110). The load beam 210 includes a generally 'T' shaped projection 220 having a distal cross member 222 and an elongated extension 221, which functions as a laterally compliant spring. In this embodiment, the cross member 222 includes a dimple 223 that is preferably formed by coining, embossing, deposition or other suitable formation technique. As with the embodiment above, the dimple 223 may alternatively be formed in the tongue 252, if desired.

A microactuator 230 is mounted to the load beam 210 at the projection 220 in a manner similar to that shown and described above in the first embodiment. A proximal and fixed portion 232 of the microactuator 230 is preferably bonded to the load beam rigid region 212 with a distal and moveable portion 224 preferably bonded to the cross member 222. The microactuator 230 is electrically terminated to the flexure traces 254 from bonding pads on the microactuator (not shown) to bonding pads on the traces 254 by wire stitching (not shown), or other suitable techniques, using windows 214 or other passages through the load beam 210 and flexure 250. The wire stitch has no adverse affect on the actuation of the microactuator 230, such as by affecting the stiffness of the microactuator 230.

As with the first embodiment above, movement of the microactuator 230 is transmitted to the head slider 260 through the dimple 223 and tongue 252 interface due to stiction. The head suspension 200 achieves sufficient stiction to provide accurate positioning of the head slider 260 relative to the tracks on the disk drive through actuation of the microactuator 230.

Figure 7:
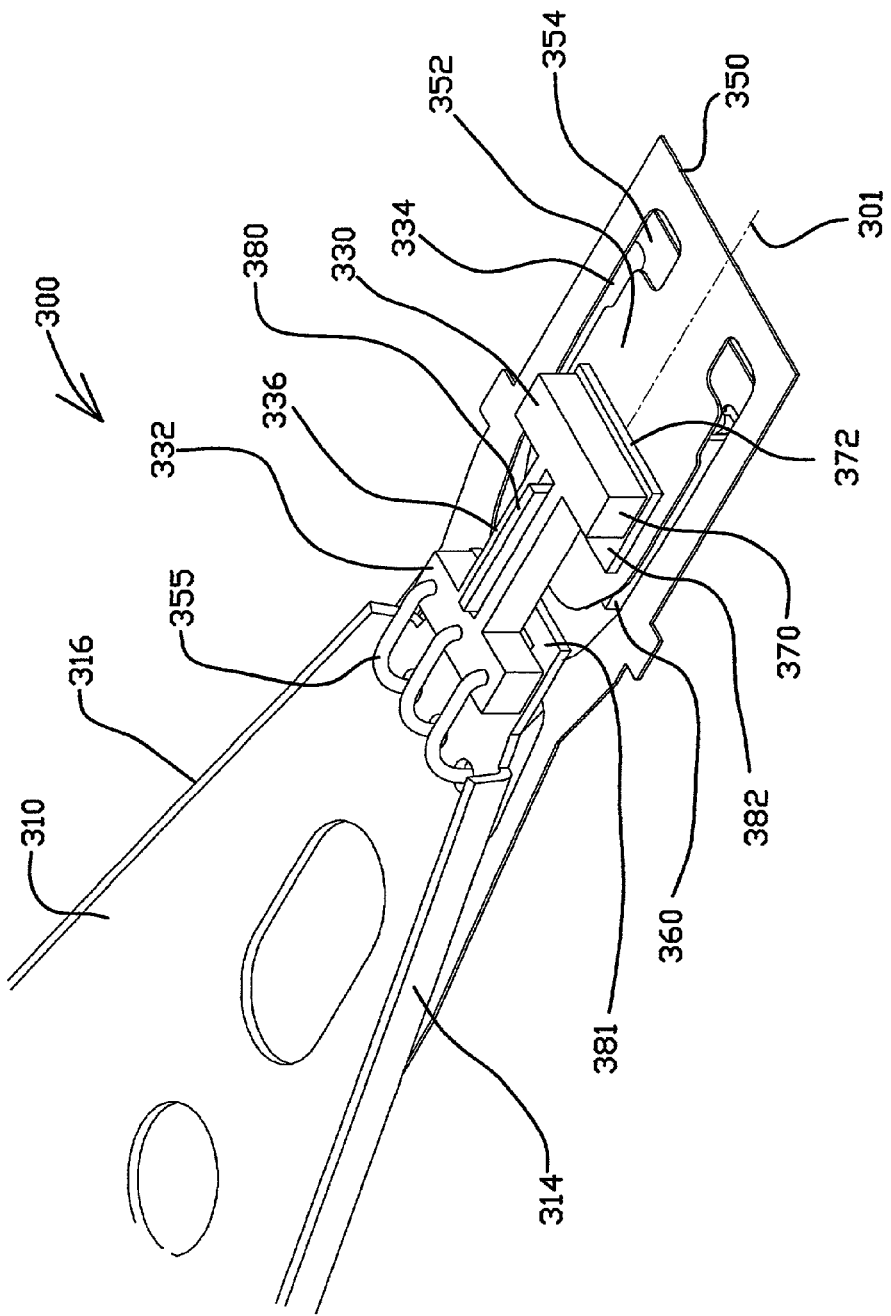
FIG. 7 is a perspective view of a portion of a third embodiment of a head suspension including a microactuator mounted to the load beam above the head slider.
Figure 8:
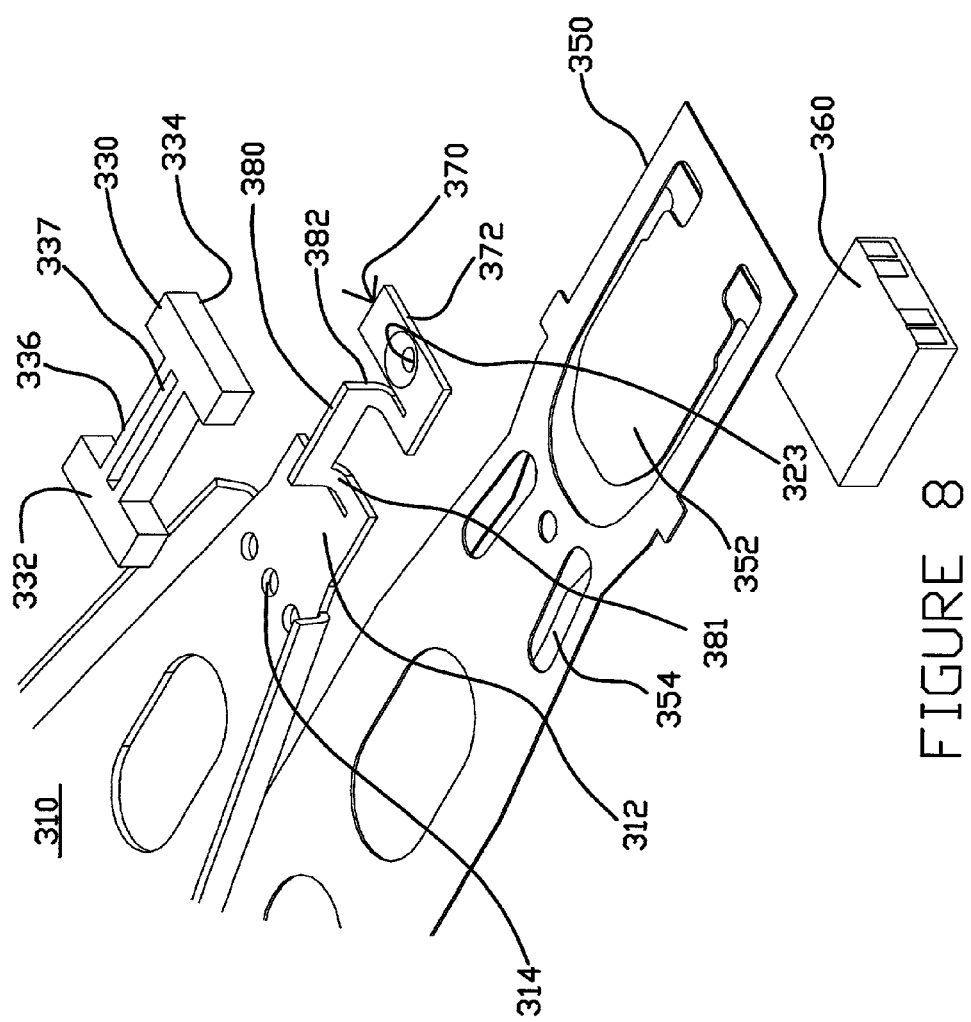
FIG. 8 is a perspective exploded view of the head suspension portion of FIG. 7.
Figure 9:
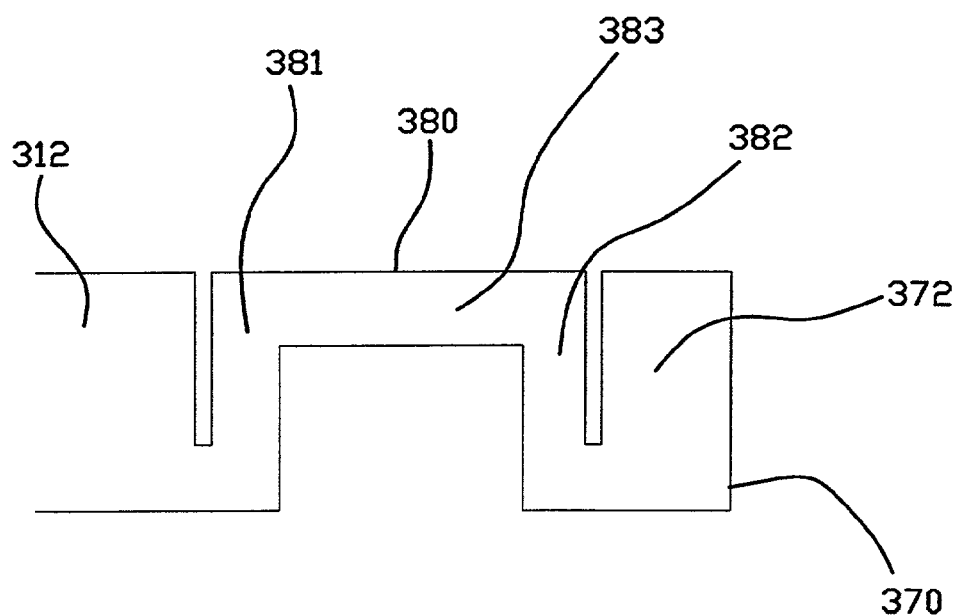
FIG. 9 is a top view of a distal portion of the load beam of the head suspension of FIGS. 7 and 8 shown prior to forming of the vertical rail.

Referring now to FIGS. 7-9, a third embodiment of a head suspension 300 is shown in accordance with the present invention. Head suspension 300 is similar to head suspension 200 and includes a load beam 310, a flexure 350 and a head slider 360 mounted to the flexure 350 at a slider mounting region or tongue 352, with the head slider 360 electrically terminated to traces 354 on the flexure 350 in a conventional and suitable manner. As with the second embodiment, load beam 310 has an overall uniform thickness 325 and includes side rails 316 that function as stiffening members to increase the stiffness of the generally thinner load beam 310. The load beam 310 also includes a projection 370 that is generally 'T' shaped with a distal cross member 372. However, in this embodiment, the projection 370 has an elongated extension that is formed as a vertical rail 380, which functions as a laterally compliant spring. The cross member 372 includes a dimple 323 that is preferably formed by coining, etching, deposition or other forming process. As with the embodiments above, the dimple 323 may alternatively be formed in the tongue 352, if desired.

As best shown in FIG. 9, the vertical rail 380 preferably starts as a portion in the same plane as the cross member 372 and the load beam rigid region 312. The vertical rail 380 includes first and second cross portions 381 and 382, respectively, connected by a longitudinal extension 383. The first cross portion 381 is partially separated from the load beam rigid region 312, and the second cross portion 382 is partially separated from the cross member 372. The vertical rail 380 is preferably formed into a vertical configuration by bending of the first and second cross portions 381, 382 so as to position the longitudinal extension 383 generally perpendicular to the plane of the cross member 372 and to locate the longitudinal extension 383 at about the longitudinal axis 301 of the head suspension 300. Although the vertical rail 380 is shown and described as being formed by one specific method, it is to be understood that one of ordinary skill in the art would recognize other compatible and suitable methods for providing a vertical rail in accordance with this invention.

A microactuator 330, similar to those shown and described above, is mounted to the load beam 310 preferably by bonding or other suitable method. The microactuator 330 includes a proximal cross piece 332 that functions as a fixed portion and a distal cross piece 334 that functions as a movable portion. The proximal and distal cross pieces 332, 334 are connected by a pair of center beams 336 that are spaced apart a distance 337. The microactuator 330 is mounted to the load beam 310 on the opposite side from the head slider 360. The microactuator 330 is positioned at the projection 370 with the distal cross piece 334 of the microactuator 330 overlying and preferably bonded to the cross member 372 of the extension 370. The proximal cross piece 332 of the microactuator 330 then overlies and is preferably bonded to the load beam rigid region 312.

In this embodiment, the center beams 336 straddle, that is are positioned adjacent to and on either side of, the vertical rail 380 with the longitudinal extension 383 projecting between the center beams 336, as best shown in FIG. 7. The microactuator 330 is electrically terminated to the flexure 350 by wire stitching at wires 355 or other suitable method. The load beam 310 includes windows 314 and the flexure includes corresponding windows (not shown) to allow passage of the wires 355 to the traces 354 of the flexure 350. The wire stitching 355 has no adverse affect on the actuation of the microactuator 330, such as by affecting the stiffness of the microactuator 330.

The vertically formed spring or vertical rail 380 provides a large amount of vertical stiffness while providing low lateral stiffness. The result is a structure that provides high shock resistance to the microactuator 330 while not degrading the available stroke of the microactuator 330. One large advantage of this embodiment is that the microactuator 330 can be increased in length without paying a large penalty in shock robustness. This would result in larger stroke for nearly the same shock robustness because most of the gram/shock load is carried through the vertical rail 380.

Figure 10:
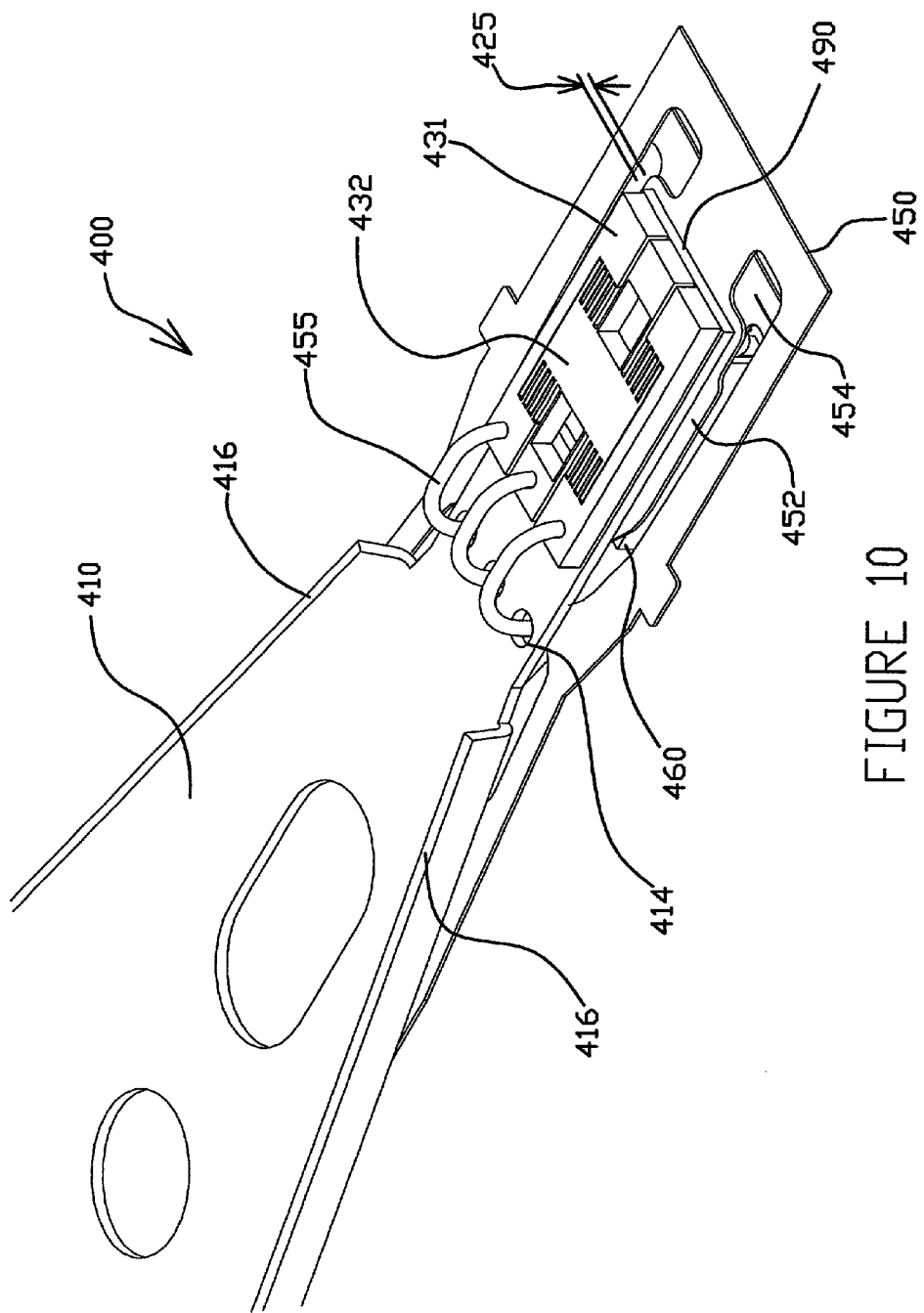
FIG. 10 is a perspective view of a portion of a fourth embodiment of a head suspension including an electrostatic microactuator mounted to the load beam above the head slider.
Figure 11:
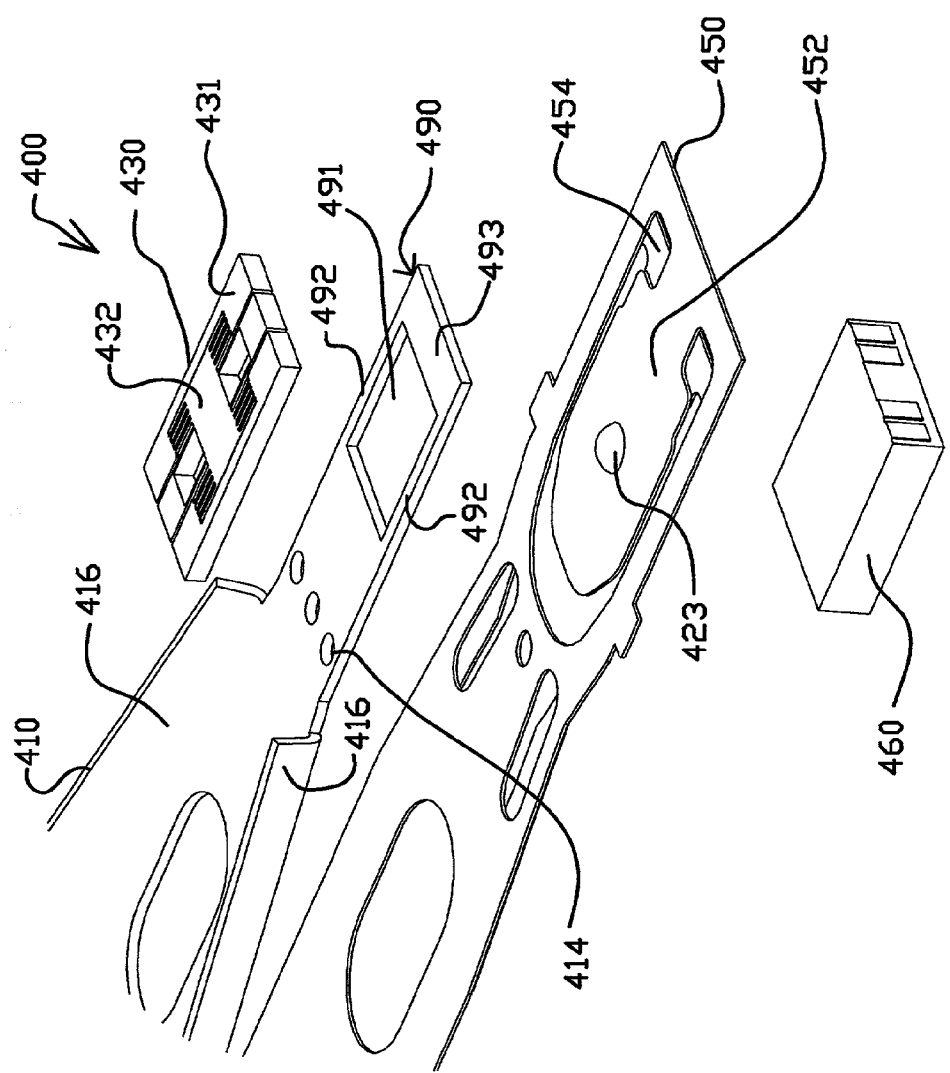
FIG. 11 is a perspective exploded view of the head suspension portion of FIG. 10.
Figure 12:
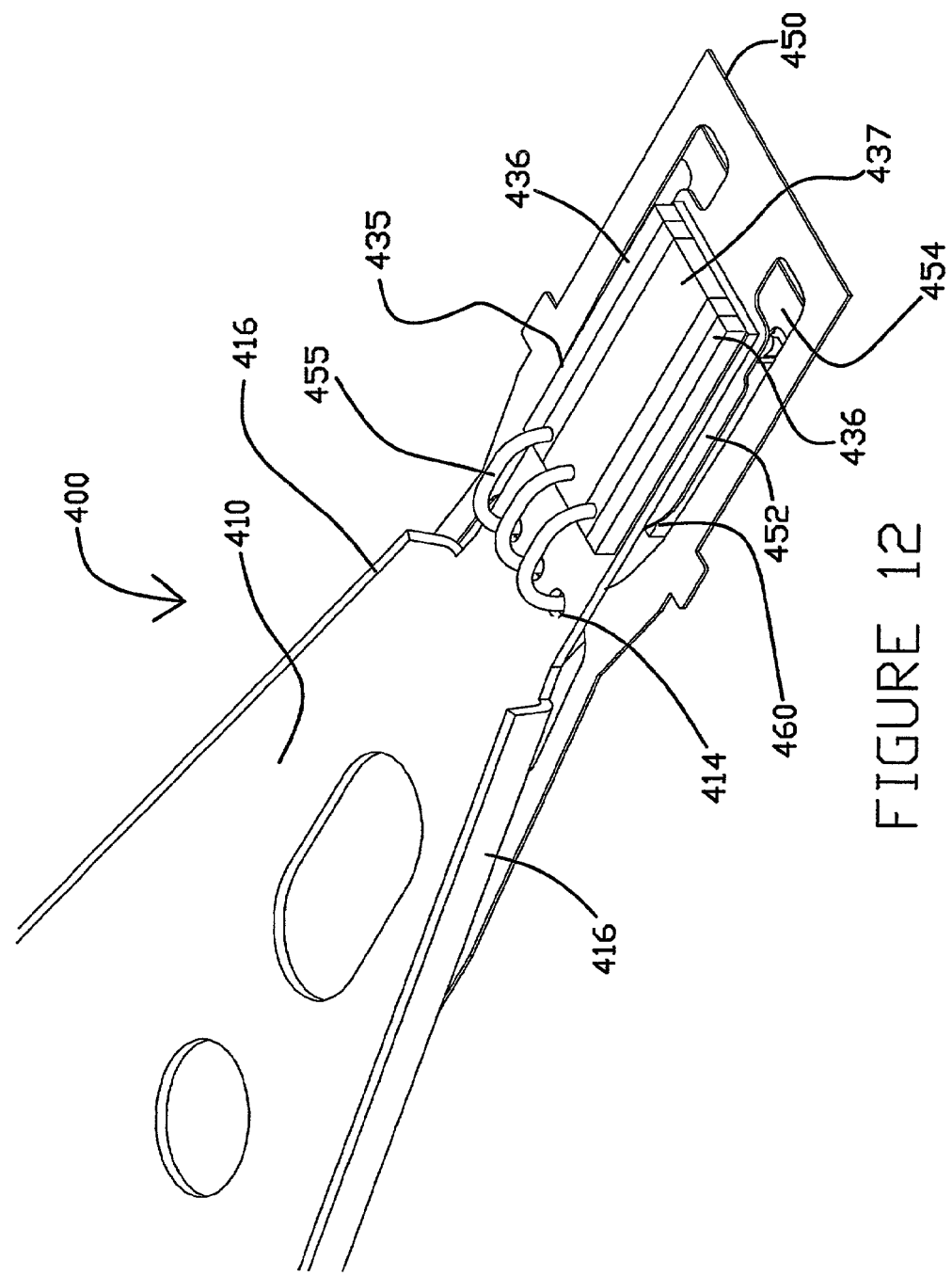
FIG. 12 is a perspective view of a portion of the fourth embodiment of a head suspension, as shown in FIGS. 10 and 11, including a piezoelectric microactuator mounted to the load beam above the head slider.

Referring now to FIGS. 10-12, a fourth embodiment of a head suspension 400 is shown in accordance with the present invention. Head suspension 400 is similar to head suspension 200 and includes a load beam 410, a flexure 450 and a head slider 460 mounted to the flexure 450 at a slider mounting region or tongue 452, with the head slider 460 electrically terminated to traces (not shown) on the flexure 450 in a conventional and suitable manner. As with the second embodiment, load beam 410 has an overall uniform thickness 425 and includes side rails 416 that function as stiffening members to increase the stiffness of the generally thinner load beam 410. In this embodiment, the load beam 410 includes an elongated rigid region 490 that is generally rectangular and has a generally rectangular aperture 491 flanked by narrow side portions 492 and an end portion 493. The aperture 491 is positioned adjacent to the tongue 452. In this embodiment, tongue 452 includes a dimple 423 that may be formed by coining, etching, deposition or other forming process.

A microactuator 430 or 435 is mounted to the load beam 410 at the elongated rigid region 490 over the aperture 491. In this embodiment, the microactuator 430, 435 may be an electrostatic actuator, such as 430 shown in FIGS. 10 and 11, or may be a piezoelectric actuator, such as 435 shown in FIG. 12. Alternately, other suitable actuation devices, including but not limited to an electromagnetic actuator, may be used. The electrostatic actuator 430 includes fixed portions 431 and a movable portion 432. The piezoelectric actuator 435 includes fixed portions 436 and a movable portion 437. The fixed portions 431,436 are supported by the side and end portions 492, 493 of the load beam elongated rigid region 490 with the movable portions 432, 437 suspended over the aperture 491. The movable portions 432, 437 contact the dimple 423 through the aperture 491.

The microactuator 430, 435 is electrically terminated to the flexure 450 by wire stitching at wires 455 or other suitable method. The load beam 410 includes windows 414 and the flexure includes corresponding windows (not shown) to allow passage of the wires 455 to the traces 354 of the flexure 450. The wire stitching 455 has no adverse affect on the actuation of the microactuator 430, 435, such as by affecting the stiffness of the microactuator 430.

As with the embodiments described above, when the movable portions 432, 437 are actuated, the movement is transmitted to the head slider 460 through the frictional interface at the dimple 423. In this embodiment, however, the frictional interface includes direct contact between the microactuator 430, 435 and the dimple 423, as opposed to the previous embodiments wherein the microactuator is mounted to the load beam which in turn includes or contacts the dimple. Alternatively, the dimple 423 may be provided on the microactuator 430, 435 itself by various formation processes, which then contacts the flexure 450 at tongue 452. As a result, the load beam 410 provides support for the microactuator 430, 435 and access between the microactuator 430, 435 and the tongue 452 of the flexure 450, thereby allowing transmission of the microactuator 430, 435 movement to the head slider 460 without requiring the load beam 410 or a portion of the load beam, such as region 490, to move as well.

In the embodiments described above, the head suspensions are shown to use conventional dimples and load beam/flexure interfaces, such as those formed from stainless steel or other conventional materials. Alternatively, other dimple structures and materials may also be used as friction enhancing structures to increase the stiction force at the dimple interface. For example, small recess structures may be etched into the load beam, microactuator and/or flexure to prevent the dimple from moving laterally while still allowing it to gimbal. In another example, the load beam, microactuator and/or flexure may be roughened by various techniques, including partial etching, abrading, or other suitable technique, to increase the coefficient of friction at the dimple interface. In yet another example, a high coefficient of friction material may be applied to one or both of the load beam, microactuator and/or flexure also resulting in a higher coefficient of friction at the dimple interface. Further examples of locking the dimple in the lateral direction include techniques such as bonding or glueing the dimple to its contact surface.

The head suspension of the present invention including a microactuator for precise second stage movement of the head slider provides numerous benefits over previous head suspension. One benefit it that it requires no internal wiring or electrical connections in the microactuator for electrical termination of the head slider. Rather, electrical termination of the head slider occurs directly to the traces on the flexure through conventional external methods. In addition, electrical termination of the microactuator is also achieved through conventional external methods. Another benefit includes the provision of increased shock robustness and stroke capability for piezoelectric type microactuators by adding vertically stiff, laterally compliant support features in the load beam to absorb a high percentage of the shock load without considerably degrading the stroke. In addition, in some embodiments, longer microactuator elements may be provided that result in increased stroke without affecting the shock robustness. Yet another benefit includes the alleviation of stack height problems that were due to location of the microactuator between the flexure and head slider by locating the microactuator on the backside of the load beam away from the head slider.

Further benefits include an increase in stroke that would have otherwise been lost due to the in-plane and out-of-plane flexing and bending of the flexure due to the reaction forces of the microactuator. In addition, potential bandwidth limiting off-track resonance modes of the flexure are minimized due to routing of the reaction forces through the load beam to which the microactuator is mounted, instead of through the flexure.

EXAMPLE

Figure 13:
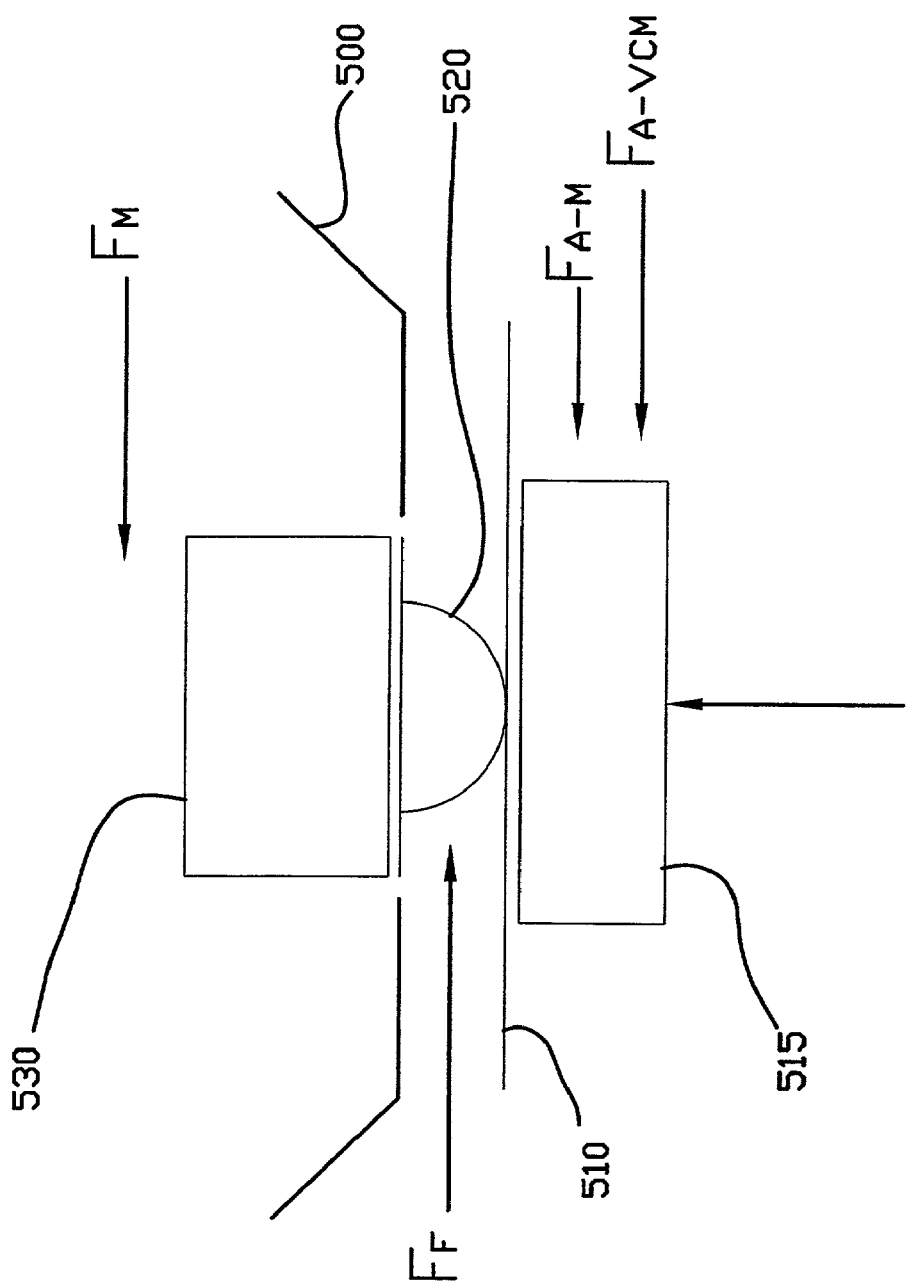
FIG. 13 is a diagram illustrating the forces applied to a dimple interface of the head suspension during actuation of the head suspension and microactuator.

The following example illustrates that the stiction force is sufficient to resist both the static and dynamic forces acting at the dimple interface of a head slider, such as those described in the above embodiments in accordance with the present invention, under normal or standard operating conditions. Referring to FIG. 13, a free body diagram is shown illustrating a dimple interface and the corresponding forces acting upon it. In this example, a stainless steel load beam 500 is shown with a microactuator 530 mounted upon it above a dimple 520 that contacts a stainless steel flexure 510. A head slider 515 is mounted to the flexure 510 beneath the dimple 520. No modifications have been made to increase the coefficient of friction at the dimple interface.

N represents the normal force a the dimple interface, also known as the gram load. $F_F$ represents the dimple stiction force. $F_M$ represents the static force of the microactuator 530 needed to displace the slider 515 a given distance, also known as the stroke. $F_{A-M}$ represents the acceleration force on the gimbal/slider due to a microactuator seek event, or a fine movement of the head suspension. $F_{A-VCM}$ represents the acceleration force on the on the gimbal/slider due to a VCM seek event, or an operational movement of the head suspension. $A_H$ represents the maximum acceleration at the slider 515 during a seek event of either the microactuator 530 or suspension arm actuator or VCM. In addition, μ is the coefficient of friction of stainless steel, g is the acceleration of gravity, k is the lateral stiffness of the flexure 510 plus the lateral stiffness of a support spring in the load beam 500, m is the mass of the gimbal/slider and s is the ±displacement of the slider 515 or stroke.

In this example, the following assumptions are made:

$\mu = 0.3$ $g = 9.81$ meters/second$^2$ $N = 3.0$ grams $= 3E\text{-}3$ Kilograms $\times 9.81$ meters/second$^2 = 0.02943$ Newtons $m = 2.0$ milligrams $k = 2.0$ Newtons/millimeter $s = \pm 0.5$ micrometer $A_H = 80$ G's $= 80 \times 9.81$ meter/second$^2 = 784.8$ meters/second$^2$ The stiction force is calculated as follows:

$F_F = N\mu$ $F_F = 0.02943$ Newtons $\times 0.3$ $F_F = 8.83E\text{-}3$ Newtons The static motor force is calculated as follows:

$F_M = ks$ $F_M = 2.0$ Newton/millimeter $\times 0.5E\text{-}3$ millimeters $F_M = 1E\text{-}3$ Newtons Since $F_F > F_M$, the static force requirement is satisfied.

The dynamic acceleration forces are calculated as follows:

$F_{A-M} = mA_H$ $F_{A-M} = 2E\text{-}6$ Kilograms $\times 784.8$ meters/second$^2$ $F_{A-M} = 1.57E\text{-}3$ Newtons $F_{A-VCM} = mA_H$ $F_{A-VCM} = 2E\text{-}6$ Kilograms $\times 784.8$ meters/second$^2$ $F_{A-VCM} = 1.5E\text{-}3$ Newtons The worst case condition is when the VCM and the microactuator are accelerating the gimbal/slider simultaneously in the same direction. Therefore, the maximum force equals $F_{A-M} + F_{A-VCM} = 3.14E\text{-}3$ Newtons. Since $F_F > F_{A-M} + F_{A-VCM}$, the dynamic acceleration requirement is also satisfied.

Although the present invention has been described with reference to preferred embodiments, workers skilled in the art will recognize that changes may be made in form and detail without departing from the spirit and scope of the invention. Further variations may be evident based on the priority provisional patent application Ser. No. 60/231,894, entitled MICROACTUATED DIMPLE FOR PIEZOELECTRIC AND ELECTROSTATIC MICROACTUATORS, filed on Sep. 11, 2000, which is wholly incorporated by reference herein. In addition, the invention is not to be taken as limited to all of the details thereof as modifications and variations thereof may be made without departing from the spirit or scope of the invention.

What is claimed is:

1. A head suspension for supporting a head slider over a disk in a dynamic storage device and providing precise movement of the head slider relative to tracks on the disk, the head suspension comprising:

a load beam;

a flexure having a slider mounting region;

a dimple interface for transmitting a load beam force to the slider mounting region; and a microactuator mounted directly to the load beam, with movement of the microactuator transmitted through the dimple interface by action of frictional forces at the dimple interface so as to cause movement of the slider mounting region transverse to tracks on the disk wherein the load beam comprises first and second sides, with the microactuator mounted to the first side, and the slider mounting region comprises a slider side and a non-slider side with the head slider attached on the slider side, and wherein the non-slider side of the slider mounting region contacts the second side of the load beam at the dimple interface.

2. The head suspension of claim 1, wherein the load beam comprises a microactuator support to which the microactuator is mounted.

3. The head suspension of claim 2, wherein the microactuator support includes a laterally compliant spring that provides vertical stiffness.

4. The head suspension of claim 3, wherein the microactuator support comprises a 'T' shaped projection formed at a distal end of the load beam.

5. The head suspension of claim 1, wherein the load beam comprises a dimple forming the dimple interface.

6. The head suspension of claim 1, wherein the dimple interface comprises a dimple fixedly connected to and extending from the load beam.

7. The head suspension of claim 1, wherein the load beam comprises first and second sides with the microactuator mounted to the first side, and the slider mounting region comprises a slider side and a non-slider side with the head slider attached on the slider side, and wherein the non-slider side of the slider mounting region contacts the second side of the load beam at the dimple interface.

8. The head suspension of claim 1, wherein the microactuator comprises a piezoelectric actuator.

9. The head suspension of claim 1, wherein the dimple interface includes function-enhancing structure.

10. The head suspension of claim 9, wherein the friction-enhancing structure comprises roughened material.

11. The head suspension of claim 9, wherein the friction-enhancing structure comprises high friction material.

12. The head suspension of claim 11, wherein the high friction material comprises a coating.

13. The head suspension of claim 9, wherein the friction-enhancing structure comprises an adhesive.

14. The head suspension of claim 1, wherein the microactuator comprises an electrical connection to traces on the flexure.

15. The head suspension of claim 14, wherein the load beam further comprises an aperture through which the electrical connection of the microactuator passes.

16. The head suspension of claim 1, wherein the microactuator is mounted to the load beam on a side opposite the slider mounting region.

17. A method of precisely moving a head slider supported by a head suspension over a disk in a dynamic storage device, the head suspension including a load beam, a flexure having a slider mounting region to which a head slider is mounted, and a dimple interface at which a load beam force is transmitted to the slider mounting region, wherein the load beam comprises first and second sides, and the slider mounting region comprises a slider side and a non-slider side with the head slider attached on the slider side, and wherein the non-slider side of the slider mounting region contacts the second side of the load beam at the dimple interface, the method comprising the steps of:

providing a microactuator mounted directly to the load beam and configured to transmit movement of the microactuator to the slider mounting region through the dimple interface by action of frictional forces at the dimple interface; and driving the microactuator to move the slider mounting region and cause precise movement of the head slider transverse to tracks on the disk.

18. The method of claim 17, wherein the load beam comprises a microactuator support to which the microactuator is mounted, the microactuator support functioning as a laterally compliant spring that provides vertical stiffness and lateral movement of the microactuator support during movement of the microactuator, and wherein the step of providing the microactuator further comprises directly contacting the microactuator support and the slider mounting region at the dimple interface.

19. The method of claim 18, wherein the step of driving the microactuator comprises moving the microactuator support.

20. A head suspension for supporting a head slider over a disk in a dynamic storage device, the head suspension comprising:

a load beam;

a flexure having a slider mounting region;

a dimple interface transmitting a load beam force to the slider mounting region; and means mounted directly to the load beam for moving the slider mounting region transverse to tracks on the disk through action of frictional forces at the dimple interface wherein the load beam comprises first and second sides, with the microactuator mounted to the first side, and the slider mounting region comprises a slider side and a non-slider side with the head slider attached on the slider side, and wherein the non-slider side of the slider mounting region contacts the second side of the load beam at the dimple interface.

21. A head suspension for supporting a head slider over a disk in a dynamic storage device and providing precise movement of the head slider relative to tracks on the disk, the head suspension comprising:

a load beam;

a flexure having a slider mounting region;

a dimple interface between the load beam and flexure; and a microactuator directly mounted to the load beam and coupled to the dimple interface, wherein in response to tracking drive signals the microactuator causes transverse movement of the slider mounting region through the dimple interface by action of frictional forces at the dimple interface wherein the load beam comprises first and second sides, with the microactuator mounted to the first side, and the slider mounting region comprises a slider side and a non-slider side with the head slider attached on the slider side, and wherein the non-slider side of the slider mounting region contacts the second side of the load beam at the dimple interface.

* * * * *

UNITED STATES PATENT AND TRADEMARK OFFICE
CERTIFICATE OF CORRECTION

| | | |
|---|---|---|
| PATENT NO. | : 7,256,968 B1 | Page 1 of 1 |
| APPLICATION NO. | : 09/952121 | |
| DATED | : August 14, 2007 | |
| INVENTOR(S) | : Todd A. Krinke | |

It is certified that error appears in the above-identified patent and that said Letters Patent is hereby corrected as shown below:

Column 11, line 41, delete "function" and insert therefor --friction--

Signed and Sealed this

Twentieth Day of November, 2007

JON W. DUDAS
*Director of the United States Patent and Trademark Office*